United States Patent [19]

Ishikawa

[11] Patent Number: 4,742,884

[45] Date of Patent: May 10, 1988

[54] BRAKE DEVICE FOR A MOTORCYCLE

[75] Inventor: Yoshimi Ishikawa, Tokyo, Japan

[73] Assignee: Honda Giken Kogyo Kabushiki Kaisha, Tokyo, Japan

[21] Appl. No.: 891,743

[22] Filed: Jul. 30, 1986

[30] Foreign Application Priority Data

Jul. 30, 1985 [JP] Japan .................... 60-168387

[51] Int. Cl.$^4$ .............................. B60G 7/02
[52] U.S. Cl. .................... 180/219; 180/227; 188/71.6; 296/208
[58] Field of Search .......... 180/227, 219, 311, 312, 180/313, 226; 188/71.6, 264 A, 264 AA; 296/1 S, 208

[56] References Cited

U.S. PATENT DOCUMENTS 4,553,622 11/1985 De Cortanze .................... 180/227

FOREIGN PATENT DOCUMENTS 15244 1/1985 Japan .................... 188/264 A
710787 6/1954 United Kingdom .

Primary Examiner—John J. Love
Assistant Examiner—Mitchell J. Hill
Attorney, Agent, or Firm—Lyon & Lyon

[57] ABSTRACT

A motorcycle having a cantilevered type rear swing arm including a rear brake between the swing arm and the rear wheel. An air inlet is provided on one side of the other rear swing arm in a thin sidewall. An air outlet through a thick sidewall adjacent the brake allows air passage through the swing arm for cooling of the brake.

4 Claims, 4 Drawing Sheets

BRAKE DEVICE FOR A MOTORCYCLE

BACKGROUND OF THE INVENTION

The field of the present invention is brake devices and, more particularly, brake devices for motorcycles employing cooling mechanisms.

In rear suspension systems for motorcycles, rear swing arms are commonly employed which are forked to either side of a rear wheel to provide support at either end of a rear axle. In such circumstances, a rear brake is easily mounted to one side of the rear wheel where it may get adequate cooling from airflow passing thereby. However, in cantilever type rear swing arms where the rear axle is cantilevered from a single rearwardly extending arm, the geometry is such that the rear brake is generally located between the rear swing arm and the wheel hub with the wheel hub being concaved. Consequently, inadequate air flow may be experienced for cooling of the brake. Under such circumstances, and particularly when the motorcycle is being ridden very hard such as in competition, overheating can be experienced.

SUMMARY OF THE INVENTION

The present invention is directed to a braking system associated with a cantilever type rear swing arm which provides adequate cooling to the rear brake. To accomplish the foregoing, a passage is provided through the rear swing arm from the outer wall thereof to a location adjacent the brake.

One means by which the foregoing may be accomplished is to provide an inlet on one outer sidewall of the rear swing arm and an outlet on an inner sidewall of the swing arm adjacent the brake. In addition, the rear swing arm may be hollow and a distinct passage between the inlet and the outlet need not be defined. For strength and support purposes, such an arrangement may include a thick inner sidewall of the rear swing arm and a thinner outer sidewall, the rear swing arm being defined as a box section.

Accordingly, it is an object of the present invention to provide an improved braking system for motorcycles. Other and further objects and advantages will appear hereinafter.

DETAILED DESCRIPTION OF THE PREFERRED EMBODIMENT

Figure 1:
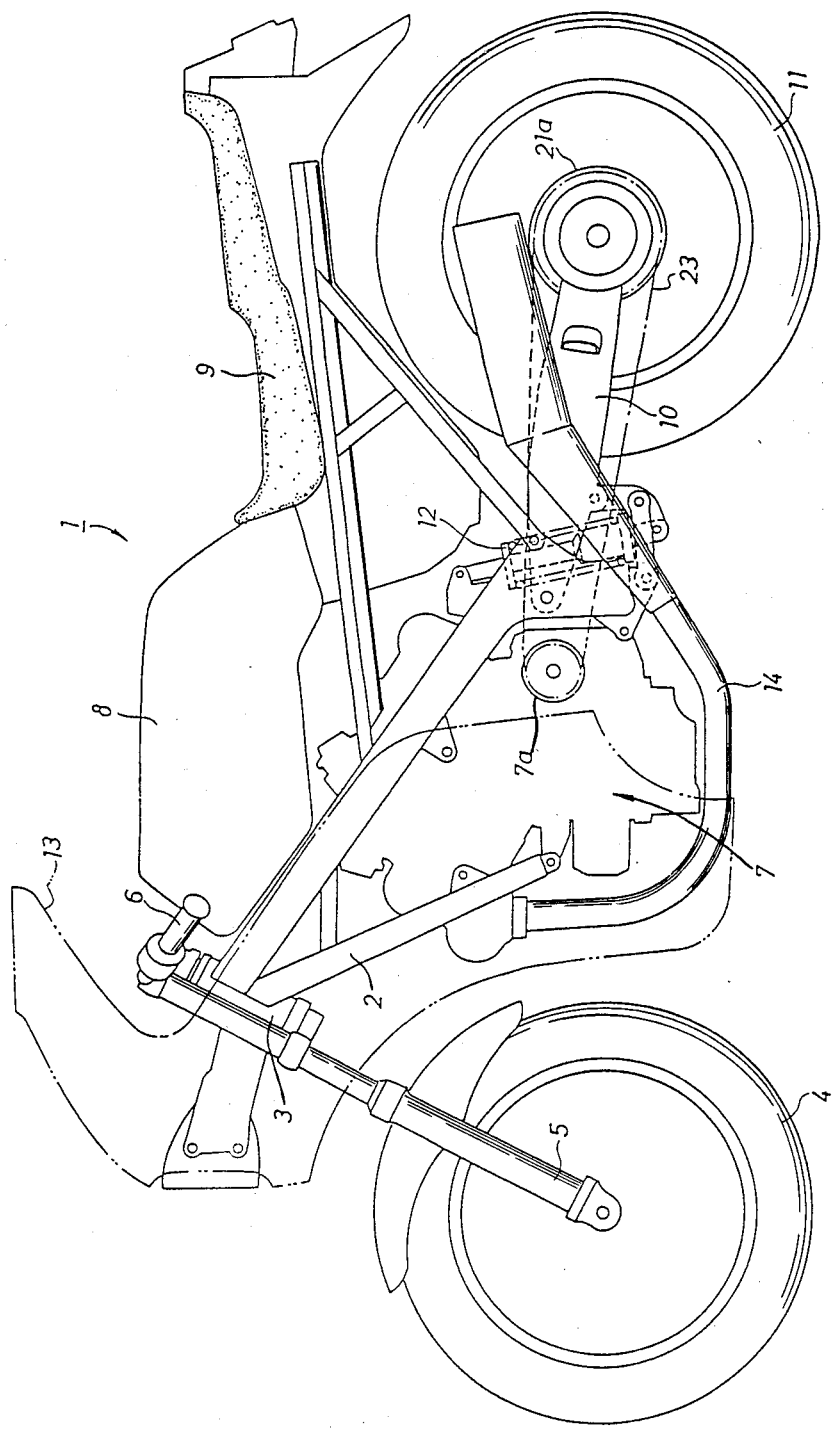
FIG. 1 is a side view of a motorcycle employing the present invention.

Turning in detail to the drawings, a motorcycle 1 is illustrated as including a frame 2, a head pipe 3, a front wheel 4 supported on a front fork 5 and controlled by handlebars 6. Mounted on the frame 2 is an engine 7 having a drive sprocket 7a. On top of the frame 2 is a fuel tank 8 and seat 9. A cantilever type rear swing arm 10 supports a rear wheel 11 and is suspended by means of a cushion 12. A front fairing 13 is also illustrated on the motorcycle. An exhaust pipe 14 extends rearwardly from the engine 7.

Figure 5:
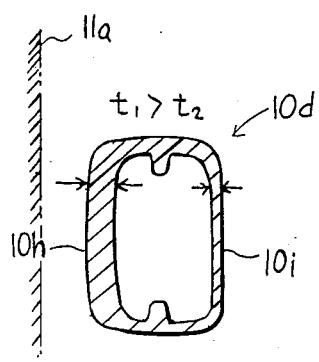
FIG. 5 is a cross-sectional view taken perpendicular to the fore and aft orientation of the vehicle.

Rear swing arm 10 is pivotally mounted at the end of frame members 2a. A front portion 10a of the rear fork 10 extends to two pivot hubs 10b spaced apart to adjacent the frame members 2a. A transverse portion 10c of the rear fork extends from one of the two front end portions to join with the main body of the swing arm to one side of the rear wheel 11. The main body 10d of the rear fork 10 then extends rearwardly to the rear portion 10e thereof. At the end of the rear portion 10e is a circular mounting portion 10f defining a support 10g for the axle assembly. In extending rearwardly, the rear fork 10 includes a concave portion 10h designed to avoid the rear wheel. This concave portion 10h defines an inner wall sidewall of the swing arm 10. An outer vertical sidewall 10i is spaced from and runs generally parallel to the inner wall 10h from the concavity rearward. As can be seen in FIG. 5, the thickness of the wall 10h is greater than that of the wall 10i for structural considerations. An opening 10j to the hollow interior S of the rear swing arm 10 is located through the outer wall 10i.

Positioned within the support portion 10g of the rear swing arm 10 is a cylindrical holder 15. The holder 15 is held securely by means of bolts 16 closing a split case portion of the support 10g. Centrically extending through the holder 15 is an axle 17. The axle 17 is rotatably mounted in bearings 18 and 19.

Positioned about an extended portion 17a of the axle shaft 17 is a drive mechanism 20 fixed to the shaft 17 at the extension 17a. An outer member 21 is rotatably mounted relative to the holder 15 about a bearing 22. The outer member 21 includes a sprocket 21a which is the driven sprocket of the chain transmission. It is coupled with the drive sprocket 7a by means of a chain 23.

A hub 24 is located at the other end of the shaft 17 and held in place by a nut 25. The hub 24 mounts the rear wheel 11 by means of nuts 26. The rear wheel 11 includes a concave dish portion 11b extending outwardly to a wheel rim 11d to support a tire 11a. Mounting bases 11c receive the nuts 26. Also mounted to the hub 24 is a brake disc 27. Thus, the disc 27 is caused to rotate with the wheel 11.

Figure 2:
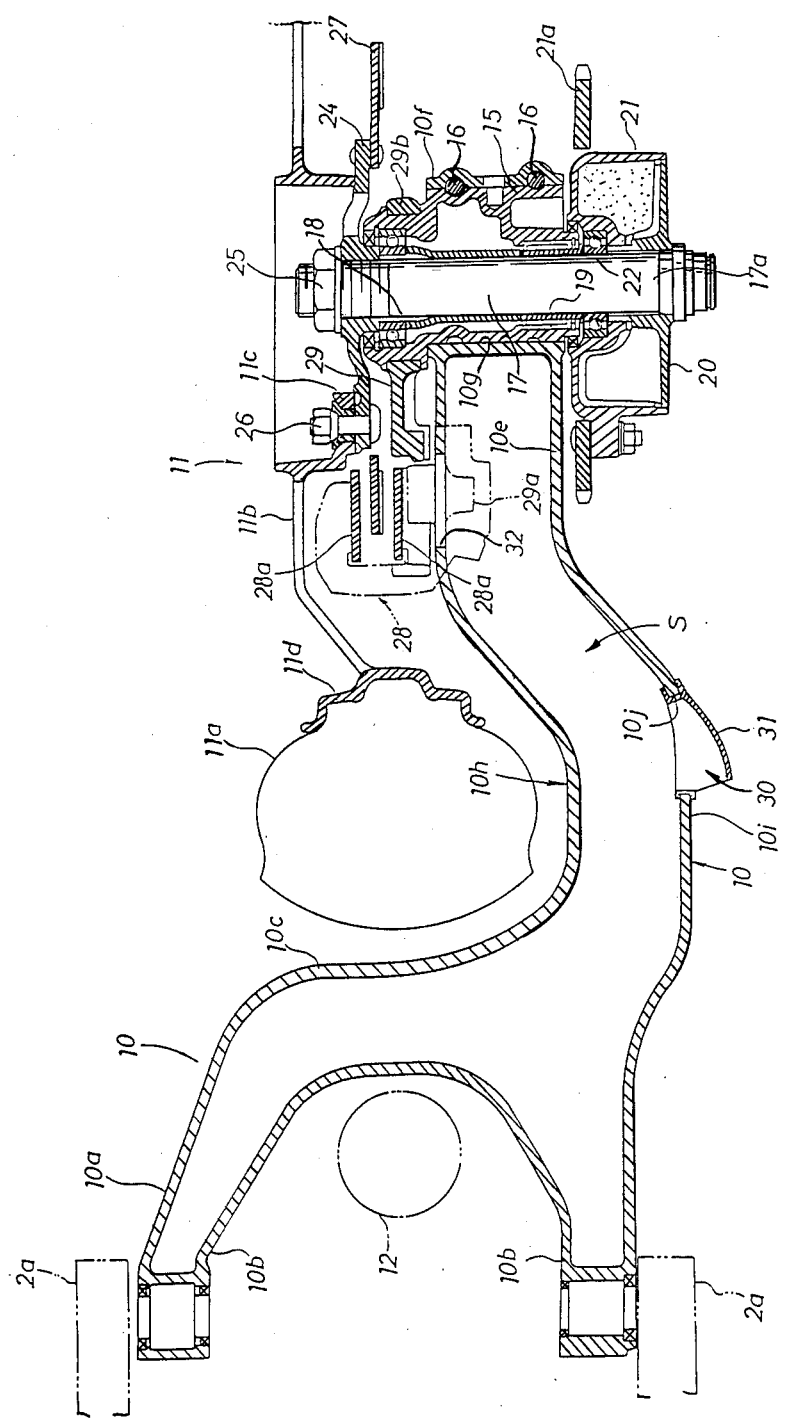
FIG. 2 is a cross-sectional plan view of the rear swing arm and axle assembly of the motorcycle in FIG. 1.
Figure 3:
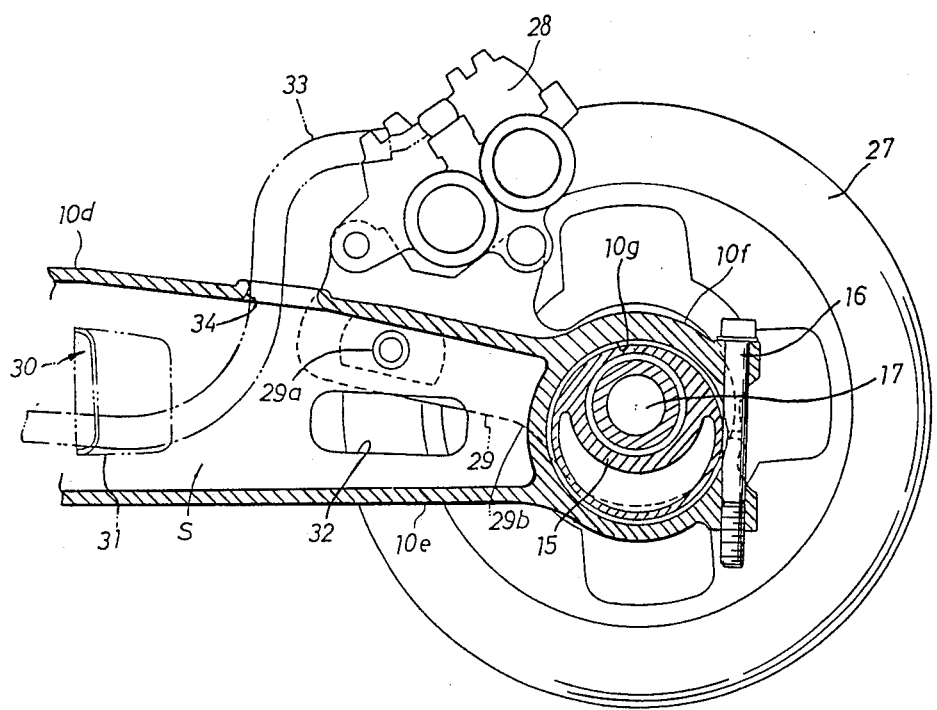
FIG. 3 is a cross-sectional side view taken through the rear swing arm of the motorcycle of FIG. 1.
Figure 4:
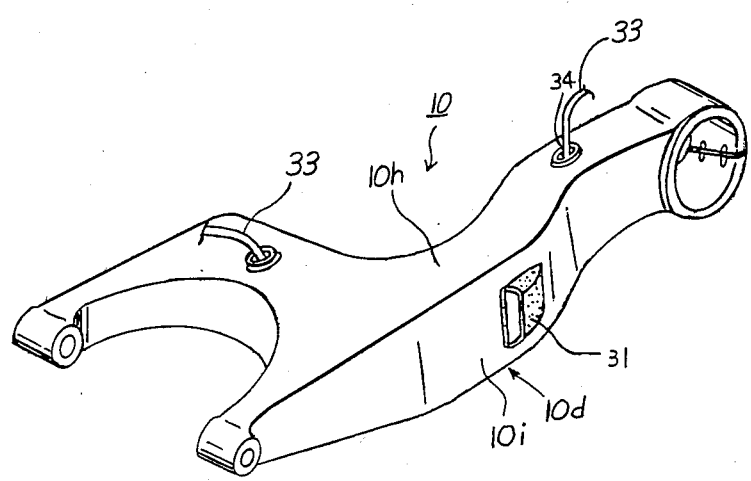
FIG. 4 is an oblique view of a rear swing arm of the present invention.

Fixed relative to the rear swing arm 10 is a brake caliper 28 having brake pads 28a. The brake caliper 28 is mounted by means of an attaching plate 29 having a base portion 29b extending about the rear end portion 10f of the swing arm 10. A connecting portion 29a of the attaching plate 29 is interlocked with the rear swing arm 10, as can best be seen in FIGS. 2 and 3, to prevent rotation thereof.

Looking specifically to the air passage, located through the hole 10j is an air inlet 30 defined by a forwardly facing scoop 31. The air inlet 30 leads to the interior s of the rear swing arm 10. Air outlet 32 is located adjacent the brake to transmit the cooling flow from the inlet 30 to the brake area. Also extending through the hollow interior S of the rear swing arm 10 is the brake hydraulic line 33 to the caliper 28. The brake line 33 passes through a hole 34 in the upper surface of the rear swing arm 10.

Thus, an improved brake system is disclosed having particular applicability to cantilever type rear swing arm systems. While an embodiment of this application is shown and described, many modifications are possible without departing from the inventive concepts herein.

Consequently, the invention is not to be limited except by the scope of the appended claims.

What is claimed is:

1. A brake device for a motorcycle, comprising
a rear swing arm, said rear swing arm being hollow and having two sidewalls spaced apart in defining the hollow interior;
a cantilevered rear axle extending from said arm;
a wheel hub rotatably mounted on said axle;
a brake located between said arm and said wheel hub;
an air inlet through one of said vertical sidewalls on a side of said arm opposite to said brake; and
an air outlet through the other said side wall adjacent said brake for cooling thereof.

2. The brake device of claim 1 wherein said sidewalls are substantially vertical.

3. The brake device of claim 2 wherein said vertical sidewall containing said outlet is thicker than said vertical sidewall containing said inlet.

4. The brake device of claim 2 wherein said inlet includes a forwardly opening scoop on the outer surface of said vertical sidewall.

* * * * *